United States Patent
Tanaka

(10) Patent No.: US 7,901,599 B2
(45) Date of Patent: Mar. 8, 2011

(54) METHOD OF AND APPARATUS FOR MOLDING A POLARIZING FILM

(75) Inventor: Hozumi Tanaka, Choufu (JP)

(73) Assignee: Tanaka Optical Kogyo Kabushiki Kaisha, Tokyo (JP)

( * ) Notice: Subject to any disclaimer, the term of this patent is extended or adjusted under 35 U.S.C. 154(b) by 2293 days.

(21) Appl. No.: 10/674,169

(22) Filed: Sep. 29, 2003

(65) Prior Publication Data

US 2004/0065967 A1 Apr. 8, 2004

(30) Foreign Application Priority Data

Oct. 7, 2002 (JP) ................................. 2002-293330

(51) Int. Cl.
*B29C 51/10* (2006.01)
(52) U.S. Cl. .................. 264/1.34; 264/1.31; 264/571
(58) Field of Classification Search .................. None
See application file for complete search history.

(56) References Cited

U.S. PATENT DOCUMENTS 6,814,914 B2 * 11/2004 Tasaka et al. .................. 264/217
6,979,419 B2 * 12/2005 Cameron ....................... 264/220

FOREIGN PATENT DOCUMENTS

WO    WO 99/54118    10/1999

* cited by examiner

*Primary Examiner* — Monica A Huson
(74) *Attorney, Agent, or Firm* — Flynn, Thiel, Boutell & Tanis, P.C.

(57) ABSTRACT

The invention provides a molding apparatus capable of obtaining a reference mark utilizing characteristics of molding of a polarizing film in the course of molding the polarizing film, and adapted for large items small scale production of the polarizing film. The molding apparatus is made up of a molding box which is opened at an upper face, a closing valve attached to a suction port communicating with an inner space of the molding box, a vacuum source connected to the closing valve, pressing means provided at an opening edge of the molding box, and a mold having a concave spherical molding face and installed in the molding box, allowing the polarizing film to be sucked onto the molding face by vacuum suction to mold a colored concave and convex polarizing film. In the course of molding the concave and convex polarizing film by allowing the polarizing film to be sucked onto the convex spherical molding face by vacuum suction, the polarizing film is differentiated in stretching and is partially deep in color, thereby forming reference marks.

1 Claim, 2 Drawing Sheets

METHOD OF AND APPARATUS FOR MOLDING A POLARIZING FILM

FIELD OF THE INVENTION

The invention relates to a method of and an apparatus for molding a polarizing film (hereinafter referred to as molding method and molding apparatus) for use in a polarizing lens.

BACKGROUND OF THE INVENTION

A polarizing film is normally colored and molded to have a concave and convex surface while it is interposed between a plastic lens or a glass lens, and used as sunglasses. In the course of molding the colored polarizing film, a reference mark is applied onto the polarizing film in a polarizing direction (in a direction of a polarizing axis) for convenient assembly of the sunglasses. Although the application of the reference mark onto the polarizing film is effected manually for every colored polarizing film using a marker having a specific ink, the operation thereof is however complicated.

Meanwhile, JP-A 2002-512379 discloses a vacuum molding method of molding a polarizing lens. The vacuum molding method is adapted for mass production but not adapted for large item small scale production.

SUMMARY OF THE INVENTION

Accordingly, it is an object of the invention to provide a molding apparatus capable of obtaining a reference mark utilizing the characteristics of molding a polarizing film in the course of molding the polarizing film, and adapted for large item small scale production of the polarizing film.

To that end, a molding method according to the first aspect of the invention comprises the steps of applying a colored polarizing film 2 to a molding face 11 of a mold 10, allowing the polarizing film 2 to be sucked onto the molding face 11 by vacuum suction to mold a colored concave and convex polarizing film 3, characterized in further comprising setting a tensile of the polarizing film 2 in a certain direction to be smaller than a tension of the polarizing film 2 in a direction perpendicular to the certain direction, allowing a stretching of the polarizing film 2 at a position on a line of the diameter of the mold 10 in parallel with the certain direction to be smaller than a stretching thereof at other positions, thereby allowing a color of the polarizing film 2 at the position, where the polarizing film 2 is small in stretching, and partially deep in color, so that the deep colored portion of the polarizing film 2 forms reference marks 12 in a polarizing direction.

The molding apparatus 1 for molding a polarizing film 2 according to the second aspect of the invention is characterized in comprising a molding box 4 which is opened at an upper face for subjecting a polarizing film 2 to a vacuum suction so as to mold a concave and convex polarizing film 3, a closing valve 6 attached to a suction port 5 communicating with an inner space of the molding box 4, a vacuum source 7 connected to the closing valve 6, pressing means 8 provided at an opening edge of the molding box 4, and a mold 10 having a concave spherical molding face 11 (hereinafter referred to as molding face 11) and installed in the molding box 4 for molding the polarizing film 2.

The molding apparatus 1 for molding a polarizing film 2 according to the third aspect of the invention is characterized in comprising a molding box 4 which is opened at an upper face for subjecting a polarizing film 2 to a vacuum suction to mold a concave and convex polarizing film 3, a closing valve 6 attached to a suction port 5 communicating with an inner space of the molding box 4, a vacuum source 7 connected to the closing valve 6, pressing means 8 provided at an opening edge of the molding box 4, a bed plate 9 accommodated in the molding box 4 in a state where it can be taken out therefrom, and a mold 10 having a molding face 11 and placed on the bed plate 9 for molding the polarizing film 2.

The molding apparatus 1 for molding a polarizing film according to the fourth and fifth aspects of the invention is characterized in that the suction port 5 has a blocking prevention function, and the mold 10 is made up of glass, and is placed in the molding box 4 in a state to be replaceable with another mold.

PREFERRED EMBODIMENT OF THE INVENTION

Figure 1:
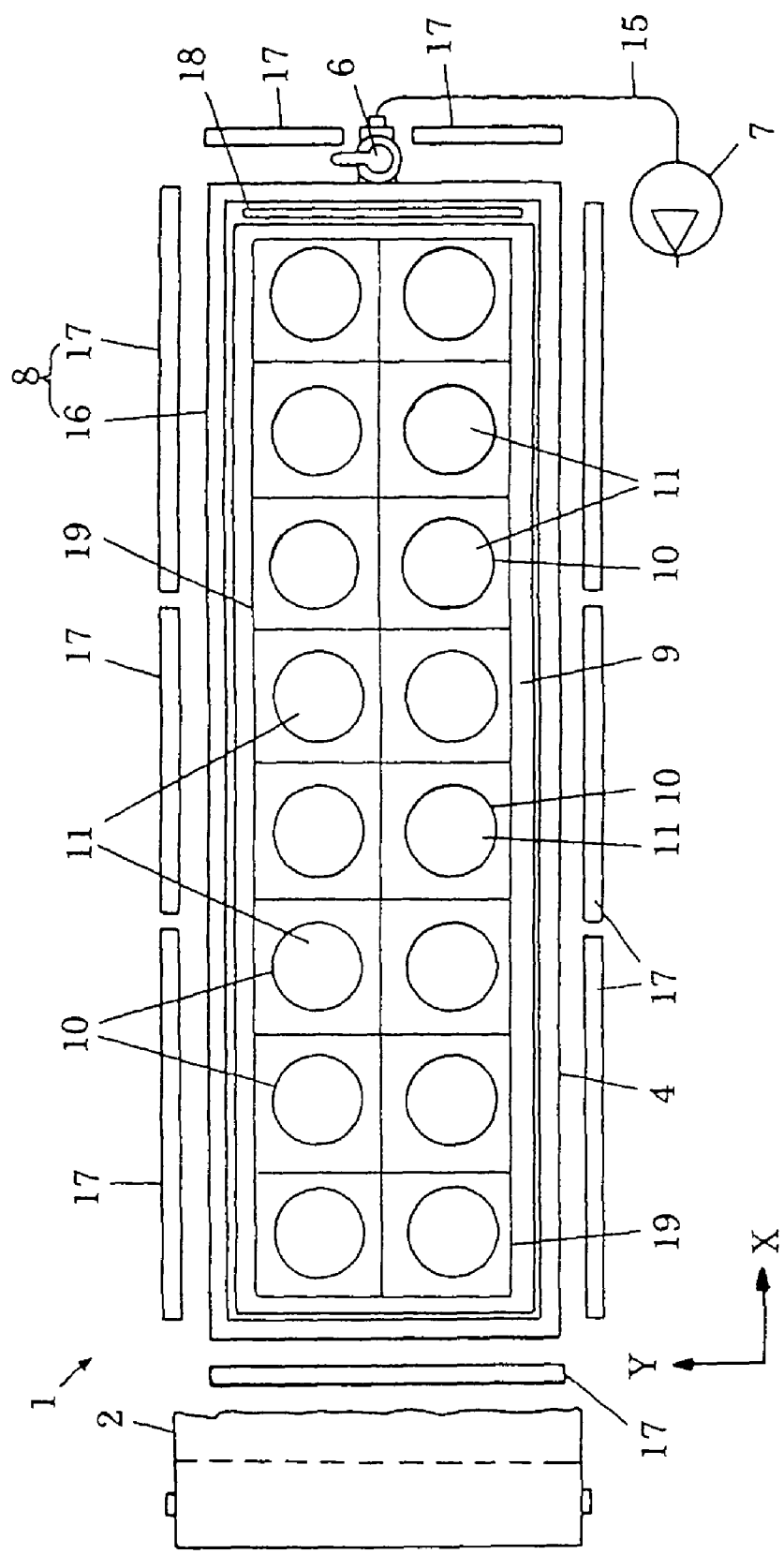
FIG. 1 is a plan view of a molding apparatus of a polarizing film.
Figure 2:
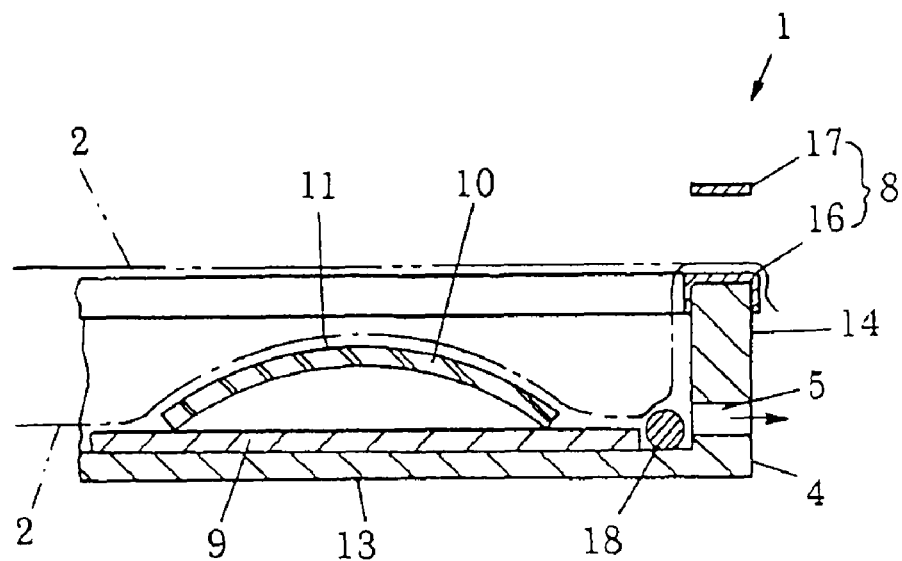
FIG. 2 is an enlarged sectional view showing a part of the molding apparatus of the polarizing film.
Figure 3:
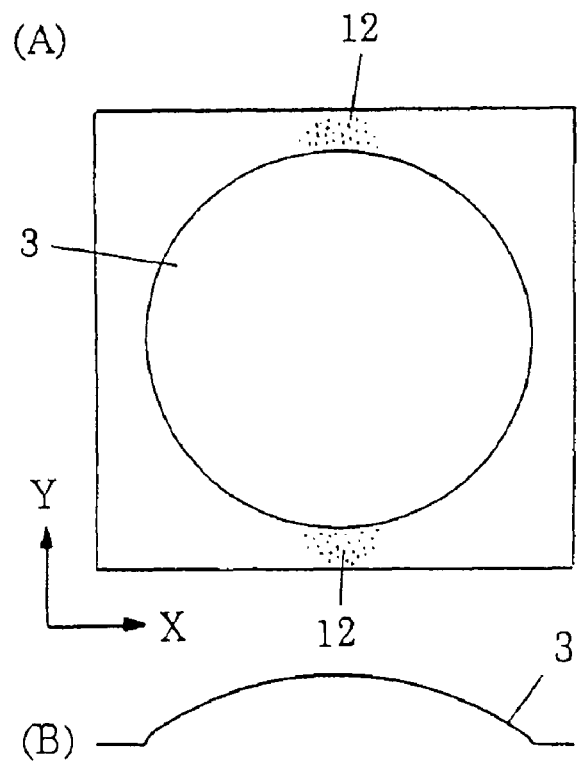
FIG. 3(A) is a plan view of a concave and convex polarizing film molded by the molding apparatus of the polarizing film and FIG. 3(B) is a sectional view thereof.

FIGS. 1 and 2 show a molding apparatus 1 of a polarizing film of the invention, and FIGS. 3(A) and 3(B) show a concave and convex polarizing film 3 which is molded using a polarizing film 2. The molding apparatus 1 of the polarizing film employs a molding method of the polarizing film of the invention and comprises a molding box 4 which is opened at an upper face for subjecting a polarizing film 2 to a vacuum suction to mold a concave and convex polarizing film 3, a closing valve 6 attached to a suction port 5 communicating with an inner space of the molding box 4, a vacuum source 7 connected to the closing valve 6, pressing means 8 provided at an opening edge of the molding box 4, a bed plate 9 accommodated in the molding box 4 in a state where it can be taken out therefrom, if need be, and a mold 10 having a molding face 11 and placed on the bed plate 9 for molding the polarizing film 2.

The molding box 4 is a box made of wood and has an upper opening and a size to the extent that, for one example, 16 pieces of concave and convex polarizing films 3 are molded at a time, and the suction port 5 communicates with a molding space inside the molding box 4 at an appropriate position of a peripheral side plate 14 of a bottom 13 of the molding box 4, for example, at a short side thereof. The closing valve 6 is, for example, manually operated, and attached to an outside of the suction port 5 and connected to a vacuum source 7 by a pressure hose 15.

The pressing means 8 comprises a frame 16 made of a magnetic body, for example, stainless steel, which is fixed to at least the upper face of a side plate 14, serving as an opening edge of the molding box 4 so as to press the polarizing film 2 on the upper face of the side plate 14 and bring the polarizing film 2 into contact with the upper face of the side plate 14, and one or a plurality of rubber magnets 17 which are magnetically sucked toward the frame 16.

Further, the bed plate 9 is accommodated on the bottom 13 inside the molding box 4 so as to place a plurality of molds 10 thereon in a state where it can be taken out therefrom, if need be. The material of the bed plate 9 is a hard plastic and serves also as a cutting mat and has a cutting line 19 considering the cutting operation after the concave and convex polarizing film 3 is molded.

Each mold 10 is placed on the bottom 13 of the side plate 14, if the bed plate 9 is not provided, and placed on the bed plate 9 if the bed plate 9 is provided inside the molding box 4 and arranged in the molding box 4 by the number, e.g., 16 pieces in one step so as to be replaceable with other molds 10.

The mold 10 is made of glass and has a shape of a concave and convex lens and it is placed on the bottom 13 or the bed plate 9 while the concave surface is directed upward as the molding surface 11. The shape and the convex spherical molding face 11 includes a complete spherical surface and also a non-spherical surface close to the complete spherical surface.

The suction port 5 has a blocking prevention function to prevent it from being blocked by the polarizing film 2. The blocking prevention function is achieved by a blocking prevention member 18. In this example, the blocking prevention member 18 is made up of a wire rod which is fixed to the inner side of the inner wall of the side plate 14 along the inner wall at the short side or along the inner wall at all the short and long sides, and a gap through which an air current flows is formed along the inner wall. The gap through which the air current flows may be formed by forming a groove along the inner wall at the short side or along the inner wall of all the long and short sides of the side plate 14.

When molding the concave and convex polarizing film 3, an operator applies the colored polarizing film 2 on the upper face of the molding box 4 having the upper opening while stretching thereof, and bonding the polarizing film 2 on all the side plates 14 of the molding box 4 while brought into contact with the side plate 14, to close the inner space of the molding box 4. The polarizing film 2 is wound in a roll shape during the polarizing processing step and the polarizing direction (direction of the polarizing axis) is a stretching direction for executing the polarizing processing step, namely, a direction in parallel with the X-axis in an X-Y coordinate in FIG. 1.

During the bonding step of the polarizing film 2, the operator stretches the polarizing film 2 in an X-axis direction while conforming a certain direction of the polarizing film 2, e.g., a direction of a long side of the molding box 4 (X-axis direction) to a direction of stretching the polarizing film 2 during the polarizing processing step (direction of the polarizing axis), so that the tensile of the polarizing film 2 in the direction of the short side of the molding box 4 (Y-axis direction) is set to be less than that in the direction perpendicular thereto, namely, in the direction of the long side of the molding box 4 (X-axis direction). A residual stress which occurred in the stretching step of a material (thin film made of polyvinyl alcohol) in the polarizing processing step resides in the polarizing film 2 in the direction of the polarizing axis, and the residual stress acts as a tensile (resistance relative to stretching), when molding the concave and convex polarizing film 3, which can be utilized to set a magnitude relation of the tensile.

Since the polarizing film 2 is stored while maintaining appropriate humidity after being subjected to a polarizing processing step, it is brought into contact with the frame 16 on the side plate 14, and it is neither stripped off nor displaced. The operator places the rubber magnets 17 along the frame 16, and the polarizing film 2 is clamped between the frame 16 and the rubber magnets 17 to fix the polarizing film 2 to the frame 16 owing to the magnetic force therebetween, thereby preventing the polarizing film 2 from being displaced by the vacuum suction, to be taken thereafter.

Then the operator opens the closing valve 6, so that the pressure in the interior of the molding box 4 is reduced owing to the vacuum suction by the vacuum source 7. The polarizing film 2 is gradually stretched by the reduction of pressure in the molding box 4 and is sucked onto the molding surface 11 of the mold 10 so that the polarizing film 2 is finally shaped along the convex spherical surface of the molding face 11. The stretching of the polarizing film 2 at this time is large in the direction of the long side of the molding box 4 (X-axis direction) but it is small in the direction of the short side of the molding box 4 (Y-axis direction) based on the setting of a magnitude relation of the tensile, so that there is a tendency in each mold 10 that the polarizing film 2 partially shrinks at the portion close to the portion on a line of the diameter of the mold 10 in parallel with the Y-axis.

As a result, the partially shrunk portions of the polarizing film are deep colored on the line of the diameter of the mold 10 and appear as the identification marks 12. These identification marks 12 can be utilized as an identification marker representing the polarizing direction (polarizing axis) of the polarizing film 2 when manufacturing the polarizing lens as a final product. The polarizing lens is normally used in sunglasses while the polarizing axis thereof is rendered in the horizontal direction relative to the sunglasses, and hence, in this example, the two identification marks 12 are positioned at the upper and lower portions of the polarizing lens relative to the sunglasses.

Thereafter, the operator shuts the closing valve 6 and enter the molding box 4 in a heating chamber while the interior of the molding box 4 is kept at a reduced pressure (vacuum state), to dry the polarizing film 2, so that the molding state of the polarizing film 2 is stabilized and fixed. When the polarizing film 2 is stabilized, the operator takes out the molding box 4 from the heating chamber, the operator separates the molded polarizing film 2 for every mold 10 by a hand cutter along the cutting line while the bottom 13 or the bed plate 9 serves as the cutting mat. As a result, the molded polarizing film 2 becomes the concave and convex polarizing film 3 and is taken out from the mold 10 together with the bed plate 9, thereby forming a final product.

Although the mold 10 has the shape of a convex and concave lens, it may have the shape of a convex lens. Further, the pressing means 8 may be formed of a means having the shape of a frame which can be pressed from above. Meanwhile, the molding apparatus 1 per se can be used not only for a colored polarizing film 2, but also for a transparent and colorless polarizing film 2.

According to the molding method of the first aspect of the invention, since the identification mark 12 having a deep color is formed on the polarizing film 2 owing to the difference in stretching of the polarizing film 2, the polarizing direction (polarizing axis) of the concave and convex polarizing film 3 as the product can be identified.

According to the molding apparatus of the second aspect of the invention, the concave and convex polarizing film 3 as the product can be formed by a simple vacuum suction type apparatus, and this apparatus can cope with various concave and convex polarizing films, so that a large item small scale production can be reasonably performed.

According to the molding apparatus of the third aspect of the invention, since the concave and convex polarizing film 3 as the product can be taken out from the inside of the molding box 4 together with the bed plate 9 owing to the presence of the bed plate 9, a plurality of concave and convex polarizing films 3 can be easily handled, and also the polarizing film 2 can be easily cut.

According to the molding apparatus of the fourth aspect of the invention, since the suction port 5 has a blocking prevention function, and the polarizing film 2 does not block the suction port 5 during the vacuum suction, the vacuum suction can be effected stably without any trouble.

According to the molding apparatus of the fifth aspect of the invention, since the mold 10 is placed in the molding box 4 in a state to be replaceable with another mold, when the mold 10 is changed, it can cope with various shapes of concave and convex polarizing film 3, and if the mold 10 is made up of glass, the molding face 11 is smooth and excellent in exfoliation property so that the surface of the concave and convex polarizing film 3 is smooth and is easily adapted to the lens.

What is claimed is:

1. A method of molding a polarizing film comprising the steps of:
   applying a colored polarizing film to a molding face of a mold;
   allowing the polarizing film to be sucked onto the molding face by vacuum suction to mold a colored concave and convex polarizing film;
   setting a tensile of the polarizing film in one direction selected from among a direction of a polarizing axis of the polarizing film and a direction perpendicular to the direction of the polarizing axis to be less than a tension of the polarizing film in the other direction perpendicular to the one direction;
   stretching the polarizing film at a position on a line of the diameter of the mold in parallel with the one direction less than stretching at other positions to thereby allow the color of the polarizing film at the position where the stretching of the polarizing film is less to be deeper and form a reference mark in a polarizing direction.

* * * * *